(12) United States Patent
Dorai-Raj et al.

(10) Patent No.: US 11,669,431 B2
(45) Date of Patent: Jun. 6, 2023

(54) ANALYTICS PERSONALIZATION FRAMEWORK

(71) Applicant: Google LLC, Mountain View, CA (US)

(72) Inventors: Sundardas Samuel Dorai-Raj, San Jose, CA (US); Zilin Du, Mountain View, CA (US); Nina Ning Ye, Sunnyvale, CA (US); Ying Chen, Sunnyvale, CA (US); Wei Zhang, Redwood City, CA (US); Annissa Al-Alusi, San Mateo, CA (US)

(73) Assignee: Google LLC, Mountain View, CA (US)

( * ) Notice: Subject to any disclaimer, the term of this patent is extended or adjusted under 35 U.S.C. 154(b) by 1043 days.

(21) Appl. No.: 16/245,920

(22) Filed: Jan. 11, 2019

(65) Prior Publication Data
US 2020/0226418 A1 Jul. 16, 2020

(51) Int. Cl.
*G06F 17/00* (2019.01)
*G06F 11/34* (2006.01)
(Continued)

(52) U.S. Cl.
CPC ........ *G06F 11/3414* (2013.01); *G06F 16/313* (2019.01); *G06F 17/18* (2013.01);
(Continued)

(58) Field of Classification Search
CPC ..... G06K 9/6256; G06F 16/313; G06F 17/18; G06F 16/24578; G06F 17/3053;
(Continued)

(56) References Cited

U.S. PATENT DOCUMENTS

| 9,405,427 B2 | 8/2016 | Curtis et al. |
| 2008/0189367 A1* | 8/2008 | Okumura ............ H04L 67/306 709/204 |

(Continued)

FOREIGN PATENT DOCUMENTS

| CN | 1967533 | 5/2007 |
| CN | 103988161 | 8/2014 |

(Continued)

OTHER PUBLICATIONS

PCT International Preliminary Report on Patentability in International Appln. No. PCT/US2019/051960, dated Jun. 16, 2021, 6 pages.

(Continued)

*Primary Examiner* — Jason T Edwards
(74) *Attorney, Agent, or Firm* — Fish & Richardson P.C.

(57) ABSTRACT

Methods, systems, and computer readable medium for personalizing an analytics user interface. The method includes generating a set of training data from received user interaction data, inputting the set of training data to a machine learning model to train the model, generating a set of user interest scores for the particular user that each indicate a user's interest in accessing information corresponding to a UI element of the application, determining, from the user interest scores, that the user is interested in a particular UI element that was not included in the initial UI and has at least a threshold score, dynamically modifying the initial UI to include the particular UI element, presenting the updated UI, monitoring further user interactions, updating the model based on the further user interactions, and modifying the updated UI based on the updated model.

22 Claims, 5 Drawing Sheets

(51) Int. Cl.
    *G06F 16/31*     (2019.01)
    *G06N 20/00*     (2019.01)
    *G06F 17/18*     (2006.01)
    *H04L 67/50*     (2022.01)
    *G06F 18/214*     (2023.01)

(52) U.S. Cl.
    CPC ........... *G06F 18/214* (2023.01); *G06N 20/00* (2019.01); *H04L 67/535* (2022.05)

(58) Field of Classification Search
    CPC ....... G06F 18/214; G06N 20/00; H04L 67/22; H04L 67/535
    USPC .......................................................... 706/12
    See application file for complete search history.

(56) References Cited

U.S. PATENT DOCUMENTS

| | | | |
|---|---|---|---|
| 2014/0236875 A1 | 8/2014 | Phillipps et al. | |
| 2014/0358916 A1 | 12/2014 | Anand et al. | |
| 2016/0239737 A1* | 8/2016 | Jiang | H04L 67/42 |
| 2016/0360336 A1* | 12/2016 | Gross | H04W 4/025 |
| 2017/0032257 A1* | 2/2017 | Sharifi | G06F 16/36 |
| 2017/0155631 A1* | 6/2017 | Du | G06F 21/6209 |
| 2018/0189367 A1 | 7/2018 | Theimer et al. | |
| 2018/0285756 A1 | 10/2018 | Dunwoody | |
| 2018/0330248 A1 | 11/2018 | Burhannuddin et al. | |
| 2019/0114151 A1* | 4/2019 | Jacobs | G06F 8/33 |
| 2019/0188272 A1* | 6/2019 | Chen | G06F 16/9535 |

FOREIGN PATENT DOCUMENTS

| | | |
|---|---|---|
| CN | 107851092 | 3/2018 |
| CN | 108604237 | 9/2018 |

OTHER PUBLICATIONS

PCT International Search Report and Written Opinion in International Application No. PCT/US2019/051960, dated Oct. 31, 2019, 12 pages.

Office Action in Chinese Appln. No. 201911011979.1, dated Mar. 23, 2023, 31 pages (with Machine translation).

Office Action in European Appln. No. 19783184.5, dated Apr. 4, 2023, 6 pages.

* cited by examiner

ANALYTICS PERSONALIZATION FRAMEWORK

BACKGROUND

This document relates to providing a framework for personalization within the analytics environment. Users interacting with content on the Internet generate interaction data that can be viewed and analyzed through different user interface (UI) elements. The user interface, as well as the content presented by the user interface, such as analytical data, can be customized through an automatic framework.

SUMMARY

In general, one innovative aspect of the subject matter described in this specification can be embodied in a method that includes receiving, by the computing device, user interaction data indicating interactions of a first user with one or more user interface (UI) elements of an initial UI of an analytics reporting application that is presented to the first user. The method includes generating, from the received user interaction data, a set of training data and inputting the set of training data to a machine learning model. In response to the set of training data, the method includes training, by the computing device, the machine learning model and generating, using the trained machine learning model, a set of user interest scores for a second user, wherein each of the user interest scores is indicative of the second user's interest in accessing information corresponding to a UI element of the analytics reporting application. The method includes determining that at least one of the set of user interest scores positively indicates the second user's interest in accessing the information corresponding to a particular UI element that was not included in the initial UI based upon a threshold score associated with the particular UI element, and in response to determining that at least one of the set of user interest scores positively indicates the second user's interest in accessing the information corresponding to the particular UI element, dynamically modifying the initial UI, including incorporating the particular UI element into the initial UI to obtain an updated UI that includes the particular UI element that was not included in the initial UI. The method includes presenting the updated UI that includes the particular UI to the second user, monitoring, after presenting the updated UI to the second user, further user interactions with the updated UI, and updating the machine learning model based on the further user interactions. The method includes selecting an updated set of UI elements that are presented in the UI based on the updated machine learning model.

These and other embodiments can each optionally include one or more of the following features. In some implementations, the machine learning model is a logistical regression model. In some implementations, the machine learning model performs deep and wide learning. In some implementations, the machine learning model is a long short-term memory model.

The method can further include determining that a score of the set of user interest scores associated with a further UI element is less than a threshold score associated with the further UI element; wherein the further UI element is not displayed to the second user based on the determining. The method can further include classifying the second user based on the second user's interactions and characteristics.

In some implementations, the received user interaction data relates to two or more different topics, and each of the two or more different topics is assigned a different weight based on the importance of the topic to the user determined from the user interest score for the corresponding topic.

The method can further include receiving a set of user interaction data indicating a group of multiple different users' interactions with one or more UI elements, generating, from the received set of user interaction data, a set of user group training data, inputting the set of user group training data to the machine learning model, and in response to the set of group training data, training, by the computing device, the machine learning model.

In some implementations, the first user and the second user are the same user. In some implementations, the first user and the second user are different users.

Other embodiments of this aspect include corresponding systems, apparatus, and computer programs, configured to perform the actions of the methods, encoded on computer storage devices.

Particular embodiments of the subject matter described in this document can be implemented so as to realize one or more of the following advantages. In certain environments, there has previously been no way to provide a "warm start," or an interface that is immediately personalized to provide relevant content or UI elements, to a new user. Users who are unfamiliar with a particular application or interface—especially one that is complicated or provides a multitude of functions or content—may be intimidated or frustrated by the UI or their experience, and may be less likely to continue using the application. For example, in certain environments, a user may begin using a new application to analyze data, and because the application is too complex, provides too much content for the user to sort through before finding content that is useful or interesting to that user, or is too difficult to navigate, the user may give up and return to using their existing application or continue using the application inefficiently. By customizing content to the needs of a new user who is unfamiliar with an application or interface to make the user experience easier, faster, and more efficient, the system increases the likelihood that the user returns to use the application again, and increases the value the user gains from the content with which the user is presented. Based on the users' interactions, the system can determine, select, and present content that is most relevant to a user, and in some situations, can refrain from presenting content that is not interesting or useful to a user. Effective personalization of content within an analytics environment that adapts the user interface so as to display data to the user that is relevant to the user, whilst not displaying data to the user that is not relevant to the user can reduce the computer resources used (e.g., processing power, memory, etc.) by refraining from presenting content the user does not find interesting. In other words, it requires fewer interactions (e.g., menu selections, network requests, etc.) for the user to be directed to the content they need, thereby providing a more efficient and effective user interface relative to traditional systems and user interfaces. Furthermore, provision of data that the user will not use can be avoided and the transmission of the data, for example from a remote server, can also be avoided thereby reducing unnecessary bandwidth utilization.

The ability to reduce the number of interactions to arrive at a desired set of data and customize user interfaces, and particularly data analytics user interfaces is becoming increasingly important as the amount/types of data collected and the number of different available reports grows because this growth in data and available reports makes it difficult for a user to arrive at the data that they are seeking. Furthermore, users in one specific role may only be interested in a subset of the data and/or reports, while users in different role may only be interested in a different subset of the data, such that a standard user interface will not be useful across the population of users. The techniques described in this document enable automated customization of the user interface that is presented to each user so that information relevant to that user is presented in the user interface. This customization can be performed based on the user's interactions with various user interface elements by leveraging machine learning models.

The system can automatically curate content and modify the presentation (e.g., through visual or aural effects such as physical placement on a page, visual prominence, visual effects, sound effects, etc.) of content to tailor the content to a particular user by mining user data to generate training data for a user interest model that learns users' interests based on previous user interaction data with content or UI elements. The previous user interaction data can indicate a particular user's own previous interactions and be used to train a user interest model specific to the particular user. In some implementations, the previous user interaction data can indicate other users' previous interactions and be used to train a user interest model specific to a particular user—the other users may be of a threshold similarity in several user characteristics to the particular user, and the previous user interaction data can include the particular user. In some implementations, the previous user interaction data can indicate other users' previous interactions and be used to train a user interest model for users having particular characteristics. The user interface may therefore be an adaptive user interface that adapts to a user, for example based upon a property of the user or based upon input received from the user associated with the user interface.

Furthermore, leveraging this method of selecting content for users allows a new user to experience a similar utility and comfort level in interacting with a particular application or environment as users who are already familiar with the particular application or environment. This method allows content with which a user is presented to be optimized, and allows content to be provided to the user based on their everyday interactions. With this system, users do not have to do anything differently from what they already do to receive more relevant content—the method uses fewer processing resources because users do not have to separately provide feedback regarding content the user finds most relevant. In some applications or environments, users do not have any customizability options. Thus, the described techniques provide more relevant content to a user in an easier-to-use format while requiring less input and fewer computing resources than currently available methods.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
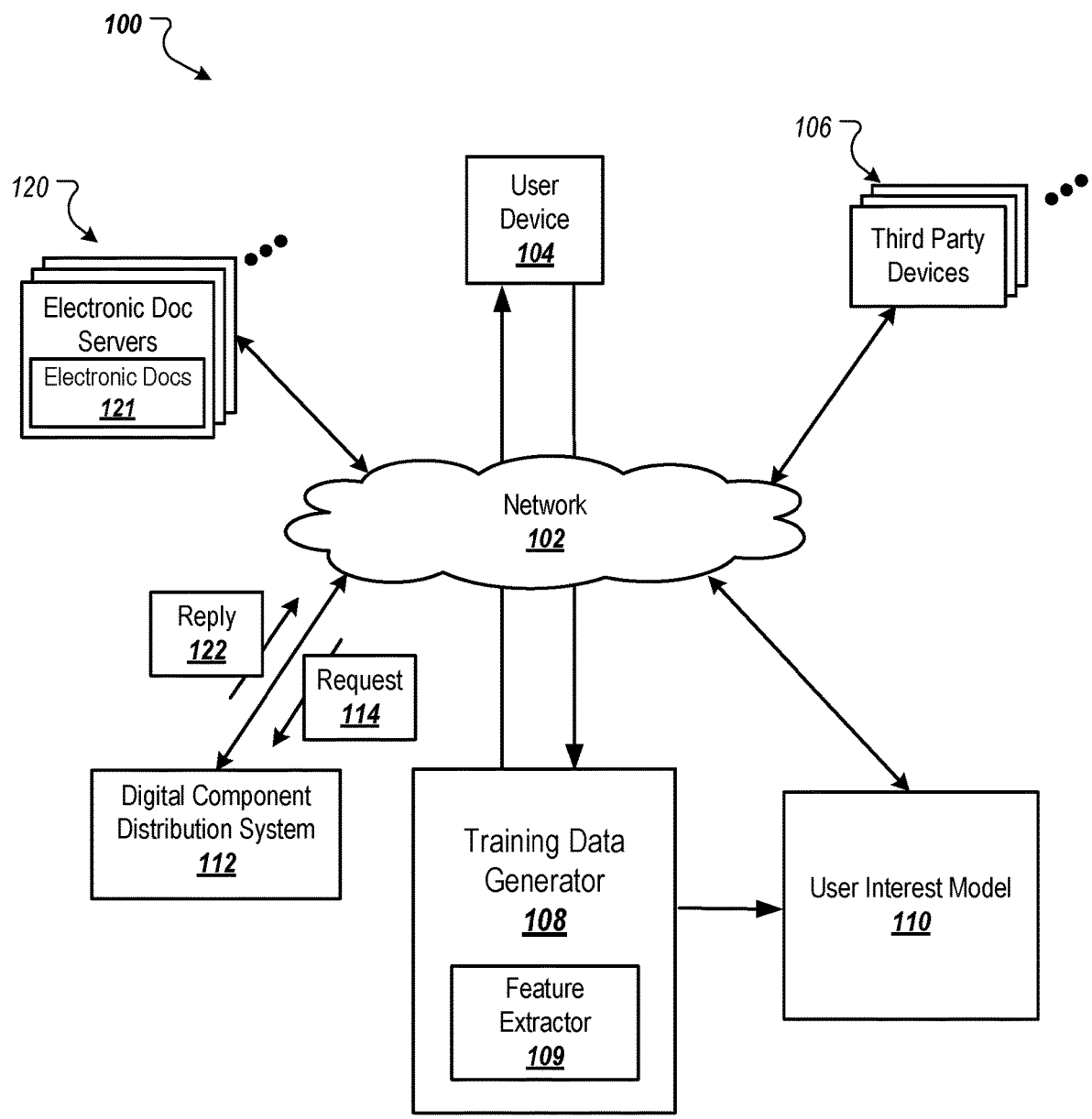
FIG. 1 is a block diagram of an example environment in which user interactions with digital components that are distributed for presentation with electronic documents are used to generate training data for a user interest model that dynamically customizes a user interface presenting analytics of the interaction data.

This document describes methods, systems, and devices that improve content relevance and ease of use and navigation for users of a particular application or environment, and allow content providers to provide more useful data for users. In some situations, when a digital component is presented to a user, the user interacts with the digital component. The user can interact, for example, by selecting the digital component, by scrolling past the digital component, by closing the digital component, by choosing to see more content related to the digital component, etc. Some user interactions with the digital component can be classified as positive interactions. Positive interactions are an indication that the particular user (or a user sharing a threshold amount of characteristics with the particular user) is interested in the digital component or content similar to the digital component. Some user interactions can be classified as negative interactions. User interactions with the digital component that are classified as negative interactions indicate that the particular user, or users sharing a threshold amount of characteristics with the particular user, are not interested in the digital component or content similar to the digital component. Based on the collected user interaction data, the system can generate training data for a user interest model that determines whether a particular user—or users having similar characteristics—is likely to be interested in a particular type or presentation of content. The system can perform this personalization process utilizing two steps: feature extraction in which user interaction data is processed to determine relevant features within the user interaction data, and user interest scoring or prediction. The system then uses the user interest scoring to personalize UI elements by presenting the UI elements most relevant to a particular user, for example out of a large number of possible UI elements that can be presented. The system provides each user of a diverse group of users with a similarly optimized experience, even when some users have fewer interactions or less experience with the system.

The server can perform feature extraction by examining interaction data generated when a user interacts with a "digital component". The digital component can, for example, be presented to a user through a user device. In this example, a distribution system receives a request for a digital component to be presented to a particular user through a particular user device associated with the user. When the request is received, the distribution system communicates with the server to determine a digital component most likely to be interesting to a user. The server receives the user interaction data and generates a set of training data from the received user interaction data by extracting features from the user interaction data to generate training examples to provide to a machine learning model. The training data can contain, for example, training examples that indicate a set of conditions and whether those conditions resulted in a positive or a negative outcome. The server then trains a user interest model by, for example, inputting the generated set of training data to a machine learning model.

There are multiple levels of personalization that can occur. The user interaction data can include both user identifiers and profile identifiers—the system's UI and content personalization can be applied on a user-specific basis, or can be generalized to a profile level across characteristics that multiple users share.

The system uses the captured user interactions with UI elements to infer user interest in a particular feature. As discussed in more detail below, features can include, for example, metrics, dimensions, filters, reports, etc.

Each of a user's interactions with a particular feature or set of features can be used to generate a set of training data for a user interest model. For example, if a user often generates a report with default metrics and selects a particular dimension of data, the system can determine that the user is interested in the particular dimension of data, and therefore the user interaction of generating a report with the particular dimension of data can be a positive example of user interest in the particular dimension of data. For brevity, dimensions of data are referred to as dimensions throughout this document.

In some implementations, the system obtains data from the environment. Webpages or applications have properties that can indicate a user's interest in certain metrics, dimensions, filters, etc. For example, a user generating a report for an application that delivers groceries within Wisconsin may be interested in the dimension Wisconsin and the metric indicating the number of new users who have begun using the application. These features of the application can be extracted and input as training features to inform the personalization of future users' experiences. The system can extract features from data such as a webpage's URL, from persistent identifier interaction logs, etc.

Note that the techniques described in this document can also be implemented in situations where a user is browsing through available applications (e.g., in an online analytics application or a web browser) or in other environments (e.g., on publisher webpages). For brevity, much of the description that follows will refer to the data analytics environment.

As used throughout this document, the phrase "digital component" refers to a discrete unit of digital content or digital information (e.g., a video clip, audio clip, multimedia clip, image, text, or another unit of content). A digital component can be electronically stored in a physical memory device as a single file or in a collection of files, and digital components can take the form of video files, audio files, multimedia files, image files, or text files and include advertising information, such that an advertisement is a type of digital component. Generally, a digital component is defined by (or provided by) a single provider or source (e.g., an advertiser, publisher, or other content provider), but could be a combination of content from multiple sources. Digital components from multiple different sources can be combined into a single electronic document (e.g., collection of various different digital components), and portions of various digital components from different sources can be combined into a single digital component with information extracted from search results (or other portions of content).

FIG. 1 is a block diagram of an example environment 100 in which digital components are distributed for presentation with electronic documents. Users' interactions with these digital components are collected and used to generate training data. The generated data is used to train a user interest model that dynamically modifies an analytics user interface. The example environment 100 includes a network 102, such as a local area network (LAN), a wide area network (WAN), the Internet, or a combination thereof. Network 102 connects electronic document servers 120, user device 104, third party devices 106, and a digital component distribution system (DCDS) 112 (also referred to as a distribution system). The example environment 100 may include many different electronic document servers 120, types of user devices 104, and third party devices 106.

A user device 104 or a third party device 106 is an electronic device that is capable of requesting and receiving resources over network 102. Example user devices 104 or third party devices 106 include personal computers, mobile communication devices, and other devices that can send and receive data over network 102. A user device 104 or third party device 106 typically includes a user application, such as a web browser, to facilitate the sending and receiving of data over network 102, but native applications executed by user device 104 or third party device 106 can also facilitate the sending and receiving of data over network 102.

An electronic document is data that presents a set of content at a user device 104 or third party device 106. Examples of electronic documents include analytical reports, webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents 121 ("Electronic Docs") can be provided to user device 104 or third party device 106 by electronic document servers 120 ("Electronic Doc Servers"). For example, the electronic document servers 120 can include servers that host publisher websites. In this example, user device 104 or third party device 106 can initiate a request for a resource, such as a given publisher webpage, and the electronic document server 120 that hosts the given publisher webpage can respond to the request by sending machine executable instructions that initiate presentation of the given webpage at user device 104 or third party device 106.

In another example, the electronic document servers 120 can include app servers from which user device 104 or third party device 106 can download apps. In this example, user device 104 or third party device 106 can request a resource, such as files required to install an app, download the files, and then execute the downloaded app locally.

Electronic documents 121 can include a variety of content. For example, an electronic document 121 can include static content (e.g., text or other specified content) that is within the electronic document itself and/or does not change over time. Electronic documents 121 can also include dynamic content that may change over time or on a per-request basis. For example, a publisher of a given electronic document 121 can maintain a data source that is used to populate portions of the electronic document 121. In this example, the given electronic document 121 can include one or more tags or scripts that cause user device 104 or third party device 106 to request content from the data source when the given electronic document 121 is processed (e.g., rendered or executed) by user device 104 or third party device 106. User device 104 or third party device 106 integrates the content obtained from the data source into the given electronic document 121 to create a composite electronic document including the content obtained from the data source. Electronic documents can also include dynamically generated reports that process data from other sources. For example, a given electronic document 121 can be a dynamically generated report that analyzes data from multiple other data sources, such as user interactions with other electronic documents 121.

In some situations, a given electronic document 121 can include one or more digital component tags or digital component scripts that reference DCDS 112. In these situations, the digital component tags or digital component scripts are executed by user device 104 when the given electronic document 121 is processed by user device 104 or third party device 106. Execution of the digital component tags or digital component scripts configures user device 104 to generate a request 114 for a resource including one or more digital components (referred to as a "component request"), which is transmitted over network 102 to DCDS 112. For example, a digital component tag or digital component script can enable user device 104 or third party device 106 to generate a packetized data request including a header and payload data. The component request 114 can include event data specifying features such as a name (or network location) of a server from which the digital component is being requested, a name (or network location) of the requesting device (e.g., user device 104 or third party device 106), and/or information that DCDS 112 can use to select one or more digital components provided in response to the request. The component request 114 is transmitted, by user device 104 or third party device 106, over network 102 (e.g., a telecommunications network) to a server of DCDS 112.

The component request 114 can include event data specifying other event features, such as the electronic document being requested and characteristics of locations of the electronic document at which digital components can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to DCDS 112. Similarly, event data specifying keywords associated with the electronic document ("document keywords") or entities (e.g., people, places, or things) that are referenced by the electronic document can also be included in the component request 114 (e.g., as payload data) and provided to DCDS 112 to facilitate identification of digital components that are eligible for presentation with the electronic document. The event data can also include a search query that was submitted from user device 104 or third party device 106 to obtain a search results page, and/or data specifying search results and/or textual, audible, or other visual content that is included in the search results.

Component requests 114 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 114 can be transmitted, for example, over a packetized network, and the component requests 114 themselves can be formatted as packetized data having a header and payload data. The header can specify a destination of the packet and the payload data can include any of the information discussed above.

DCDS 112 chooses digital components that will be presented with the given electronic document in response to receiving the component request 114 and/or using information included in the component request 114. In some implementations, a digital component is selected (using the techniques described herein) in less than a second to avoid errors that could be caused by delayed selection of the digital component. For example, delays in providing digital components in response to a component request 114 can result in page load errors at user device 104 or cause portions of the electronic document to remain unpopulated even after other portions of the electronic document are presented at user device 104 or third party device 106. Also, as the delay in providing the digital component to user device 104 or third party device 106 increases, it is more likely that the electronic document will no longer be presented at user device 104 when the digital component is delivered to user device 104 or third party device 106, thereby negatively impacting a user's experience with the electronic document. Further, delays in providing the digital component can result in a failed delivery of the digital component, for example, if the electronic document 121 is no longer presented at user device 104 or third party device 106 when the digital component is provided. Such delays are reduced when the digital component is not provided with the content presented to the user. Users can obtain the content more quickly without the digital component, and with less data to transmit and no delay between the database where the component is retrieved and the server that is providing the component, a user's experience is improved.

The system 110 uses data generated from user interactions with digital components such as electronic documents 121 to personalize the selection of electronic documents 121 presented to user devices 104.

Training data generator 108 collects user interaction data and generates one or more sets of training data for a machine learning model to determine user interest in particular topics, types of content, forms of content presentation (e.g., types of UI elements), and various other features of electronic documents 121. Training data generator 108 can be implemented as one or more servers, and includes a feature extractor 109.

Feature extractor 109 analyzes user interaction data to extract features of the interaction, including user characteristics and electronic document characteristics. User interaction data can be included in, for example, request 112 for an electronic document 121. In some implementations, when a user interacts with an electronic document served through user device 104 or third party device 106, the interaction generates separate data that indicates features of the interaction. User interactions can include, for example, clicking on a UI element within an electronic document 121, viewing a particular section of the electronic document 121, clicking to see more data related to a particular topic or section of the electronic document 121, etc.

Feature extractor 109 collects user interaction data by, for example, accessing stored user interaction data or intercepting communications between user device 104 or third party device 106 and electronic document servers 120. In some implementations, user interaction data can be transmitted directly from user device 104 or third party device 106 to feature extractor 109. User interaction data can be provided in various formats, and depending on the format, can indicate different features. User interaction data in the form of an access request URL can indicate whether a user has entered search terms, narrowed their search using filters, elected to view data having a particular dimension value, etc. For example, an access request URL of "https://example.com/dataanalyticsreport/report/visitors-demographicsgender/drilldown=analytics.gender:female,analytics.age:25-34/" can indicate that the user has interacted with a report on example.com/dataanalyticsreport and has drilled down by two dimensions (gender and age) to see analytics for women between the ages of 25-34. User interaction data can come in other forms, such as data stored in association with a persistent identifier (e.g., a cookie), event data (e.g., application listeners track events such as mouse clicks, scrolling, zooming, touch gestures, etc.), or other types of interaction data that can be collected from devices such as user device 104 or third party device 106, electronic document servers 120, DCDS 112, or over communications interfaces such as network 102.

Once user interaction data is collected and features are extracted, the system analyzes the extracted features to predict user interest in additional content, information, or analytics reports. In order to analyze the extracted features, the system generates training data to input to a model. For example, the system can generate training examples for a neural network. The trained neural network can then predict user interest in various features and provide recommendation data to DCDS 112. Recommendation data can indicate a feature in which a particular user, or a set of users satisfying a particular profile of user characteristics, is interested. The trained neural network can also provide recommendation data in the form of user interface generation data. For example, the user interface generation data can be instructions that, when executed, present content to a user in a particular format. For example, if a user routinely selects a graphical view of an analytical report instead of a tabular view, the system can determine, from the user interaction data for this user, that this user—and other users satisfying a particular profile of user characteristics matching those of this user—is interested in viewing the analytical report in a graphical view. Similarly, if the user has historically requested presentation of a specific analytics report following presentation of a different analytics report, the system can modify the user interface to present a link to the specific analytics report when the different analytics report is presented, even if that link to the specific analytics report is not predefined in the presentation of the different analytics report, and even if the specific analytics report is in an unlaunched state.

Training data generator 108 receives extracted features of user interaction data and generates one or more sets of training data for a machine learning model. Training data generator 108 can generate a training example using the user interaction and the extracted features. For example, training data generator 108 can generate a negative training example for a neural network based on user interaction in which a corporate user dismisses a suggested query including metrics indicating the number of new users in Michigan, for example, by selecting a UI element that causes the suggested query to be dismissed. Generated training examples may additionally include data indicative of one or more properties of the user associated with the user interaction.

User interest model 110 (UIM 110) receives training data from training data generator 108, trains a machine learning model, and predicts user interest. UIM 110 can be, for example, a neural network that receives training examples and user or profile information as input and outputs a prediction of content in which the user (or users fitting the profile information) is likely interested. UIM 110 can be applied to a particular user for whom user-specific data is received. For example, UIM 110 can be used to predict whether user ElectronicsSalesManager12 is interested in metrics such as the number of new users within several dimension values: Female, 18-24, Spain. If a confidence level in the personalized recommendation generated by UIM 110 is at least a threshold level of confidence, UIM 110 can provide the recommendation to DCDS 112 or user device 104 to either generate a personalized UI or present personalized content, such as UI elements that are predicted to be of greatest interest to a particular user.

UIM 110 can also be applied to a particular user for whom only profile-level data is available. For example, new users may not have interacted with a particular application or environment to a sufficient level for the system to generate personalized content or content presentation formats. The system can then provide profile-level personalization recommendations for content or content presentation formats. For example, if a new (or infrequent) user is the director of operations for sales for a home and garden magazine based in New York, the system can determine a profile for the user that indicates she is a director of operations, that her department is in sales, that her company is based in New York, and that her interest is in metrics and dimensions related to growth in sales.

In this particular example, the system has not gathered sufficient user-specific data for the new user through user device 104. UIM 110 can receive user interaction data from third party devices 106 of other users, and UIM 110 can analyze user interaction data that matches at least a threshold amount of the new user's profile. For example, the system can analyze user interaction data that matches at least three of five profile characteristics of the new user. In some implementations, particular profile characteristics must match (e.g., users must have the same job title, users must be in the same state, etc.). Once the system determines and selects user interaction data from third party devices 106 matching a threshold amount of the new user's profile, UIM 110 can train the machine learning model using training examples generated by training data generator 108 from the selected user interaction data. The trained UIM 110 can then be used to predict or select content or content presentation formats likely to be of interest to the new user on a profile-level. This enables a customized user interface to be generated for a user even when little to no historical interaction data for that user is available. In this way, a user can be guided more quickly to data of interest, for example, by modifying the user interface to incorporate UI elements that launch reports for the data of interest while these reports are in an unlaunched state, and without requiring the user to navigate a large number of user interfaces or menus to launch the reports for the data of interest.

In some implementations, if the confidence level in a personalized content or content presentation format recommendation for either the user-level or the profile-level does not meet a threshold level of confidence, the system does not provide personalized recommendations.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a server.

Figure 2:
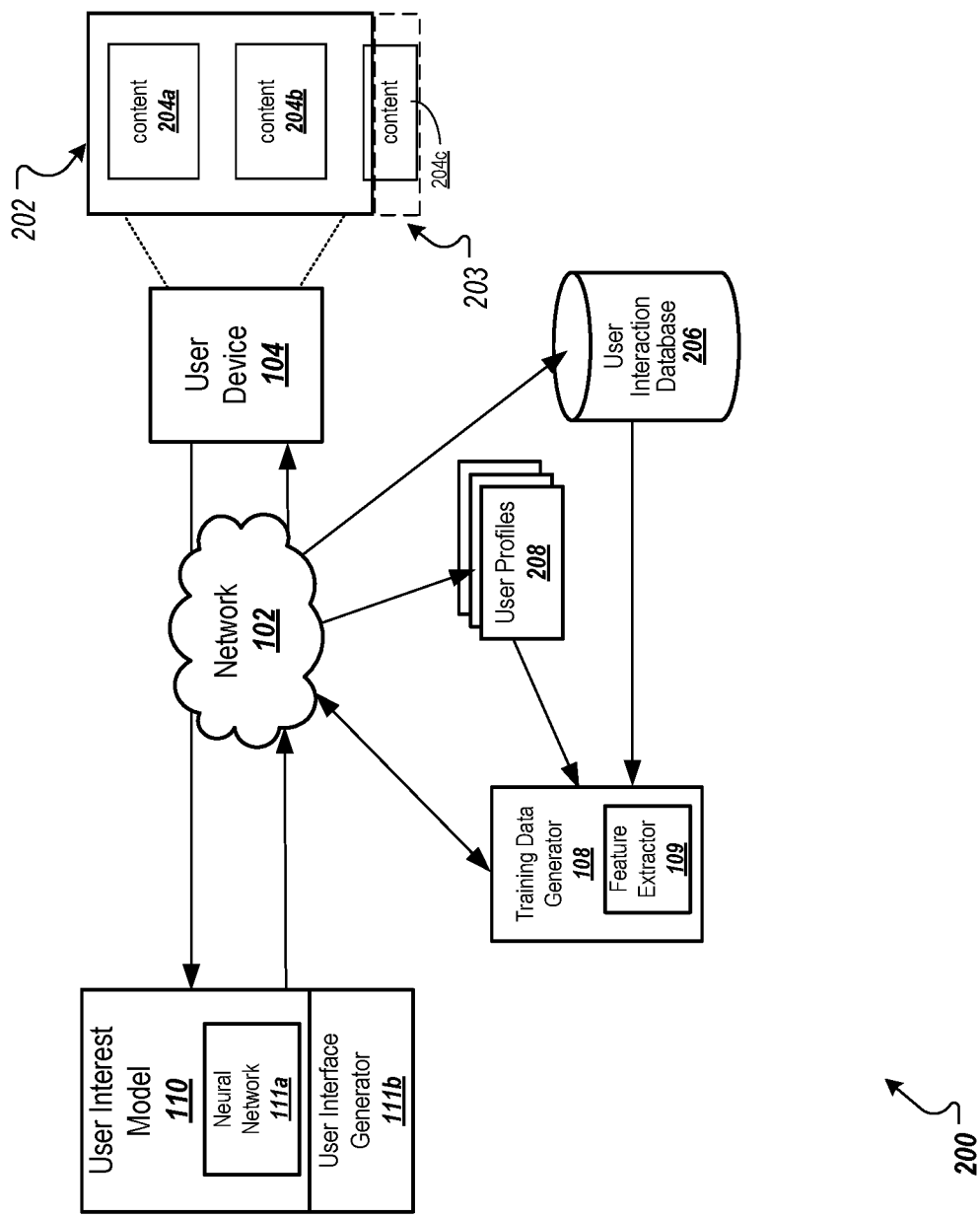
FIG. 2 is an example data flow for customizing content in applications based on previous user interaction data.

FIG. 2 is an example data flow 200 for implementing the personalization framework in the example environment of FIG. 1. Operations of the data flow 200 are performed by the UIM, or server, 110 in communication with user device 104 or third party device 106. In some implementations, stages of the flow 200 are performed within a network environment, such as the environment 100.

The system collects user interaction data and extracts features of those user interactions. The user interaction data can be stored in user interaction database 206. This user interaction data can include user profile data that can be stored in user profiles 208. Once the system has collected features of the user interactions, the system generates a set of training data to train a user interest model that predicts content or content presentation formats likely to be of interest to a particular user. The training data is provided to a machine learning model, and the model provides an output vector that predicts values of content in which a user is likely to be interested.

In this particular example, communications performed as stages of flow 200 occur over network 102, which can be the Internet.

User device 104 includes a display that presents, within a UI, content to a user of user device 104. The visible portion of the content is within a viewport 202 of the display. In some implementations, the viewport 202 is a visible portion of a particular application or webpage that a user of user device 104 is accessing. For example, if a digital component is presented within an application that does not cover the entire visible area of the display of user device 104, then the viewport 202 is determined to be the visible portion of the application. In certain applications, there may be more content than can be displayed at once within the viewport 202. Such content may be on the same application section as the content within the viewport 202 of user device 104, but is not actually visible to a user, and is within an out-of-view portion 203 of user device 104. For example, the content 204a and content 204b is visible within viewport 202, but content 202c is within portion 203 that is not visible to a user of user device 104. Content 204 (i.e., content 204a, content 204b, and content 204c) can be various types of digital components as described above with respect to FIG. 1. Analytical applications support a large number of options for presenting data, and not all reports, statistics, and available types of metrics can be presented in a visible portion of the analytical UI at once. UIM 110 gathers user interaction data to determine and predict user information most likely to be of interest to a particular user. UIM 110 then modifies analytical UIs to present links to relevant reports, UI elements that display particular metrics, etc. to provide the particular user with the most relevant information when the available options are not possible to be displayed given limitations of the display, and can be overwhelming.

A user of user device 104 interacts with content 204 displayed by user device 104, and user interaction data indicating features of these interactions are generated and collected. User interaction details are detailed below and with respect to FIG. 3.

The user interaction data can be collected in various forms, all of which feature extractor 109 can parse and process. Entities that can have a user interest score include metrics, dimensions, dimension filters, reports, audiences/segments, goals, etc. A report can include analytics data on a particular set of data, and can aggregate or analyze a particular set of data. Target audiences, or segments, indicate the type of users for which the user is interested in seeing analytics. A user's goals can indicate target metrics the user wishes to see while monitoring the analytics.

A metric measures performance, behavior, and/or activity. For example, a performance metric for a particular application can include newUsers, a metric that indicates the number of new users within a particular time period. Other metrics can indicate, for example, the percentage of sessions that are newly created sessions, the number of unique page views, the average amount of time spent on the webpage, the number of unique social interactions taking place on the webpage, the average server connection time, the average page load time, etc. Different environments can have different metrics-applications can have metrics that indicate the amount of time spent on a particular screen of the application, sites can have metrics that track events, search engines can have metrics that indicate the number of clicks a particular result gets within a predetermined period of time, and other environments can have various other metrics, including custom metrics that are user defined.

User metrics that are custom or user-defined can be given more weight than default settings or features that are not directly selected by the user. For example, if a user creates a custom metric to be included in a report or report template, the system can apply a higher weight to the custom metric within training examples provided to a user interest model.

A dimension represents a particular category or characteristic of the user interaction data. For example, dimensions for a set of user interaction data can include the type of device on which the user interaction was performed, the country in which the user interaction was performed, the type of interaction that was performed, etc. Different environments can have different dimensions available, and users can define custom dimensions to focus their analysis or sort their data on dimensions that are interesting to them.

A filter can be a specific feature according to which data is sorted. For example, a filter can be applied to show only data within the last 30 days, or all data from Georgia, Nebraska, and New York, or only data from a particular profile of user characteristics. Different environments can have different filters, and users can define custom filters according to their interest in the particular data analyzed.

In some examples, user device 104 is a mobile device, such as a cellphone, a virtual reality device (e.g., implemented in a headset or other device such as a combination of a speaker and a display), a smartphone, a personal digital assistant (e.g., implemented in a tabletop speaker or other device such as a combination of a speaker and a display), or a tablet, and communicates over a wireless network. Training data generator 108 and UIM 110 may communicate over a wired network separate from the wireless network over which user device 104 communicates. For example, user device 104 may be a smartphone that communicates over a wireless cellular network, while training data generator 108 and UIM 110 may be remote servers that communicate over wired networks.

UIM 110 receives user interaction data from user device 104 over network 102, and predicts user interest in digital components. UIM 110 then utilizes the user interest scores to modify UI elements for presentation at user device 104. For example, UIM 110 may determine that user device 104 has interacted with a digital component provided by a digital component provider through a digital component server that indicates a positive interest in reports on the number of users who make more than one purchase a day at clothing stores. UIM 110 identifies a unique identifier associated with the interaction data. The unique identifier can be, for example, a user or device identifier. In some implementations, the unique identifier can be a user identifier that is carried across platforms and devices. For example, the unique identifier can be a user account used across browsers and devices, and can be used regardless of whether the user is using a software application or a web application.

The unique identifier can be protected when sent to third parties. For example, the unique identifier can be encrypted when sent in the forwarded opportunity to presented content. In some examples, the forwarded opportunity and the unique identifier can be transmitted over the Secure Sockets Layer (SSL). In some examples, the unique identifier associated with a user of user device 104 can be reset through various methods, including via a factory reset of user device 104. A user can also opt-out of having their unique identifier sent in any requests for content at all.

In some implementations, the environment in which the system operates is a web application, and user interaction data can be extracted from the URL of the web application. For example, the URL can indicate hit page counts as well as the number of get page requests. Each hit has a page request URL that indicates the name or network location from which the request was made in addition to a profile and/or user identifier, in addition to indicating that a user selected section of the page, the metrics that the user is selecting, that the user has selected the drilldown UI element, etc.

Feature extractor 109 can determine features on a user-specific level and on a profile level. Exemplary profile-level fields include quality of service (QOS) level (e.g., whether the user has premium service or not), the time at which the profile was created (e.g., at 13:20:12 on 20-12-2013), the network location from which a page was requested, the name of the page (e.g., Birds are Cool—Website and Store), the time zone, or the last time the profile was seen. This profile data can be stored, for example, as user profiles 208.

The user interaction data can be collected from a log of data collected from a user interface or from the user interaction events. In some examples, front-end of an application can create custom events to track these interactions.

Dimensions can be determined through explicit user interactions or through default settings. In some implementations, a user has explicitly selected a dimension, and these user-explicit manipulations (e.g., selecting a dimension from a drop-down menu, drilling down to the dimension, etc.) can be recorded. Dimensions can also be determined from default settings, such as default dimensions selected when content, such as a report, is generated. For example, if a user in Italy generates a weekly report on the number of active (at least one user interaction) users aged 12-17, feature extractor 109 can determine the default dimensions (e.g., the country of Italy) as well as the explicit dimension (e.g., users aged 12-17, active users, etc.). In some implementations, a report may be too general and include too many dimensions to be analyzed for user interest. For example, in an overview report, the default dimensions may not be generated because that would include every dimension available to the system.

Feature extractor 109 can also determine features from, for example, a snapshot of the content the particular user was viewing at the time the data is collected. If a user is viewing a particular portion of a report on monthly conversions, feature extractor 109 can record the configuration of the report and relevant features at the time the user is viewing it.

In some analytics environments, content known as "insights" can be provided for display to a user. Insights provide an analytical insight into user interaction data in which a user may be interested. For example, a pop-up window (or card) within a monthly review tab of a report that indicates a year-long snapshot of the monthly progress of the metric in which the user is most interested can be presented as an insight. Metrics for insights can include whether the insight was served, how many times the insight was served, whether the insight was viewed, when the insight was viewed, whether insight was bookmarked for future reference, when the insight was bookmarked, whether the insight was discarded, when the insight was discarded, how many times the insight was shared, whether the insight was marked helpful, how many times the insight was marked helpful within a predetermined period of time (e.g., 30 days), how many times the insight was marked unhelpful within a predetermined period of time, or any actions available for interaction with the insight. These, and other metrics, can be applied to other applications or content depending on the context of the content. There can be default values for each metric. In some implementations, default values can be user-specified.

Users can interact with each other, or with the environment through, for example, a question and answer interface. Dimensions, metrics, and filters used when a user asks a question or selects a question relevant to their interests are recorded. For example, if a user asks a question "How many new customers navigated through Landing Page 5 before making at least one purchase?" the system can determine that the user is interested in the metric indicating first-time customers, customers who made at least one purchase, and the dimension Landing Page 5.

Users can also create custom alerts for data. For example, a regional strategist might be interested in monitoring the user traffic levels at each of a number of regional product pages, and could create a custom alert when the user traffic levels accelerate (positively or negatively) by a threshold amount to determine when regions are trending in popularity. In another example, a user could be identified as a new user who is responsible for worldwide reach for a family of products, and can create a custom alert for when a threshold number of customers make purchases of products from the family on an aggregate level. UIM 110 can use, for example, machine learning techniques to determine custom reports, metrics, dimensions, alerts, etc., in which a user would be interested.

The user interaction data can be stored, for example, by linking user identifiers and profile identifiers with the extracted features. The user identifiers are linked to a particular user, while profile identifiers are linked to profiles of user characteristics that can be associated with multiple users having the same interests, role in an organization, etc. Additional data, such as the frequency of usage of each dimension, metric, filter, etc. in generating training data can be stored and analyzed to determine which metrics are most useful. In some implementations, the system can perform this analysis to learn an optimal distribution of computing resources to best service its user base.

The user interaction data, user interest scores, frequency of usage data, etc. can be stored in different formats for ease of use depending on the environment and the needs of the users. For example, the system can store user interaction data in column-oriented format so that the values of each field is stored separately, and the computational overhead is proportional to the number of fields that are actually read out from storage. The system can access only the fields that are relevant, and therefore avoid reading the entire record to access, for example, a single field; thus, the system can more efficiently use resources in this format than other storage formats. Other formats that allow varying levels of efficiency for other environments include storing data in spanner tables, in matrix factorization, etc. In some implementations, the system stores different types of data in different formats according to the most frequently used environment for that set or type of data.

Data can be cleared at regular intervals, and in some instances, data is only stored for a predetermined period of time to maintain the privacy of users. The system can determine a minimum period of time to maintain a level of accuracy when predicting user interest, and can store user interest data for the determined minimum period of time. In some implementations, users can indicate a period of time for which they will allow the system to store their data. For example, users interested in more personalized experiences can allow the system to store their data for longer periods of time. The system can store the user interest scores in a profile for the user while clearing the user interaction data to maintain the user's level of personalization.

Once feature extractor 109 has processed the user interaction data and extracted relevant features, training data generator 108 generates training examples. For example, training data generator 108 can format the user interaction data features into pairs of input and expected output. These input-output pairs can be provided to UIM 110 to train the model.

In this particular example, training data generator 108 samples user interaction data to generate training data to input to neural network 111a. Training data generator 108 can select a random sample to obtain negative examples to train, for example, a logistic regression model. Training data generator 108 can also take a sample of the most frequently unviewed metric to maximize margins. Training data generator 108 can take multiple samples of user interaction data to generate one or more sets of training data.

When generating the set of training data, training data generator 108 selects training features used within the set of training data from historical user interactions with reports. Training data generator 108 determines training example weights in one of several ways. In some implementations, training data generator 108 can weight each training example equally, and sample only data points within a predetermined period of time. In some implementations, training data generator 108 can using decay functions to weight training examples differently depending on how recent the example is.

The system can split training, validation, and generating test data into various percentages of modelling time and resources. The system can also cross validate the output of the model.

UIM 110 receives training data and trains a machine learning model to select digital components and/or content presentation formats. The machine learning model may use any of a variety of techniques such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the machine learning model uses supervised learning. In some examples, the machine learning model uses unsupervised learning. The machine learning model can also use wide and deep learning, long short-term memory modeling, boosting, matrix factorization, user embedding, or item embedding.

Wide and deep learning trains a wide linear model for memorization along with a deep neural network for generalization across many features to combine the strengths of both models, and is particularly useful for generic, large-scale regression and classification problems with sparse inputs. For example, wide and deep learning is useful for problems with categorical features with a large number of possible feature values.

For ease of explanation, the operation of neural network 111a is described with respect to logistic regression, but it is understood that neural network 111a could perform any of a number of other techniques as described above.

Neural network 111a is used to predict the probability for a particular user/profile pair to be interested in a given feature. For example, given a (user, profile) pair and the metric newUsers, neural network 111a can be trained to predict the probability for the (user, profile) being interested in the given metric newUsers. In this example, neural network 111a uses training labels that indicate whether the (user, profile) pair is interested in newUsers. For singular entities (e.g., metrics, dimensions, dimension filters, audiences/segments, goals, etc.), UIM 110 calculates a user interest score for the entity. When a particular digital component includes two or more entities, UIM 110 can calculate a separate user interest score and confidence score for each entity and aggregate the scores to generate an overall interest and confidence score.

The output of neural network 111a is a prediction of the probability that a particular user, either the user for which the previous user interaction data was collected, or a user that matches the profile data to a certain extent. UIM 110 can provide personalized digital component recommendations, personalized UI elements and presentation formats, and/or personalized suggestions for user queries, such as search queries, form fields, etc.

In some implementations, UIM 110 can provide suggestions for digital components, such as particular metrics to be included in a report, dimension values of interest to the user, particular dimension filters to apply, etc. UIM 110 can determine how much content is visible within viewport 202 of the UI. In some implementations, if there is more content presented in the UI than there is visual real estate within the viewport 202, and content must be presented within viewport 203 that is not visible, UIM 110 can assign visual presentation positions to particular digital components according to the user interest score for the components.

In some implementations, UIM 110 determines the presentation format of the digital components that is most likely to be interesting to a user. For example, if a user prefers to generate reports with information tabulated so she can sort the data herself, UIM 110 can learn that the user prefers tabulated information to graphical information, and can generate the appropriate user interface—a table—in which to present digital components that are likely to be interesting to the user. UIM 110 generates UI elements with user interface generator 111b. User interface generator 111b generates instructions that, when executed, cause presentation of a selected digital component in a particular visual format that is likely to be interesting to the user.

In some implementations, UIM 110 can determine content that a user is likely to be interested in with respect to a query. For example, when a user enters a search query "How many returning customers did the," UIM 110 can determine that, because the user is an account manager for accounts in China and Japan, the user is likely to be interested in the query "How many returning customers did the China and Japan branches see this month?" UIM 110 can provide suggestions, such as autofill suggestions for queries, form fields, drill down paths, etc. for a user based on the previously recorded user interactions. When providing suggested questions, UIM 110 evaluates whether a particular user is interested in the metrics and dimensions the suggested question contains; suggested questions with higher overall interest scores are more likely to be shown within a visible area of the analytics UI.

UIM 110 calculates an overall user interest score for a particular feature can be a time-decayed frequency score. This overall score may be used most frequently when considering whether to personalize the user's experience around a particular metric/dimension. UIM 110 also calculates a confidence score, which represents how accurate the personalization data is for that particular user or user profile. In some implementations, if the user-specific personalization score does not meet a threshold score, the system can use profile-level personalization instead. Profile-level personalization is less specific, but is still useful in that the particular user is likely to have similar interests to other users with the same profile, or a threshold amount of similarity to the profile. For example, in the case of a new user, if it is her first time navigating an analytics application, and the system does not have enough user-specific user interaction data to generate a personalization with a confidence score meeting a threshold score, UIM 110 can provide personalized reports on the profile level if the profile-level personalization has a confidence score meeting a threshold score.

The system can also conserve computing resources by determining not to personalize data/UI for a particular user if there is not enough information, and instead providing default information. For example, if a user's user-specific personalization confidence score and profile-level personalization confidence score both do not meet the threshold confidence level. Instead of providing personalized data that the user might not be interested in, the system can provide the default information and learn from the user's interactions with the default data to determine what data to provide next time/for a similar user with a similar profile.

For example, for each user, potential digital components in the form of insights can be scored by UIM 110 based on each metric and dimension in the component. UIM 110 can then utilize the user interest score to rank and score insights more accurately and then rank them either higher or lower for users. In some implementations, if there is a limit to the number of digital components that can be shown within the viewable portion 202 of the UI, UIM 110 can determine the visual presentation position of the digital components such that components that are likely to be of interest to the user are presented within the viewable portion 202 of the UI, and that components that are more unlikely to be of interest to the user are presented toward the unviewable portion 203 of the UI. For example, if an insight for user profile jane1234 includes metric Bounce Rate and dimension Japan, UIM 110 calculates scores for the metric and dimension and determine how interested jane1234 is in each of these entities to factor the interest scores for the separate entities into the overall interest score for the insight.

Applications can have a diverse user base in terms of interests and skill level; in order to service as much of the user base as well as possible, many applications are developed to become powerful and feature-rich. As an application's feature set expands, the complexity and diversity of options becomes overwhelming for many users. For example, while a user can access an application and see hundreds of reports, segments, toggles, and actions, but a majority of her interest lies in a few metrics (e.g., target number of users within Segment 5A and Publisher Revenue), in a certain set of dimensions (e.g., Device Category and Country), and in certain values (e.g., Mobile, China, and Japan). Without information regarding the topics that interest the user, the application cannot be optimized for her needs to provide a useful, simple UI.

By providing user interest scores for entities within the analytics environment, the system allows for personalization to be used in scoring algorithms for scoring metrics that are interesting to the user higher than metrics in which the user is not interested. User interest scores can be used to identify users' goals and intents (e.g., make more campaign revenue, optimize product merchandising) and classify metrics by intent to present growth opportunities to the right users. User interest scores can be used to generate suggested queries or content for a user to search for—for example, suggestions for particular metrics/dimensions/filters can be suggested to be included with the queries based on the user's context.

Context includes the entities (e.g., report, data point, insight, etc.) that the user is looking at, or questions they've previously submitted to the system. When suggesting an entity, such as a metric, dimension, or dimension filter) that is not within the user's current context, the system may choose a metric, dimension, or dimension filter has a high user interest score based on the user's previous interactions. For example, if the user has previously asked for "revenue growth in the last year," a follow-up suggestion can be "revenue growth for the United States in the last year."

By understanding users' interests on multiple levels, the system can develop and tailor features to the users and other users sharing characteristics with those users. For example, an application of the system can include servicing corporate customers or enterprise customers having a specific role in the organization. By understanding the metrics, dimensions, and values that a user cares about (e.g., e-commerce revenue, a particular campaign, data collected from Alabama, etc.), the system can present relevant digital components to the user in a way that is easy for them to understand. This improved machine learning efficient UI generation system reduces computing resources used to determine and select digital components and generate UI elements without wasting resources on content or formats unlikely to be interesting to a user. Understanding topics the user cares about or the user's role within the enterprise can be used as input or context to a user interest learning model. For example, if a user is in an email marketing position, then the user may be interested in content delivered by email, as well as e-commerce revenue. Understanding the user's business intent or goal can be used as input to a user interest learning model. For example, if the user's intent is to make at least $200 k in revenue next month from mobile content, then the system can determine that the user is interested in mobile devices and in marketing revenue. UIM 110 can then weight these metrics more heavily in its user interest scoring model.

Figure 3:
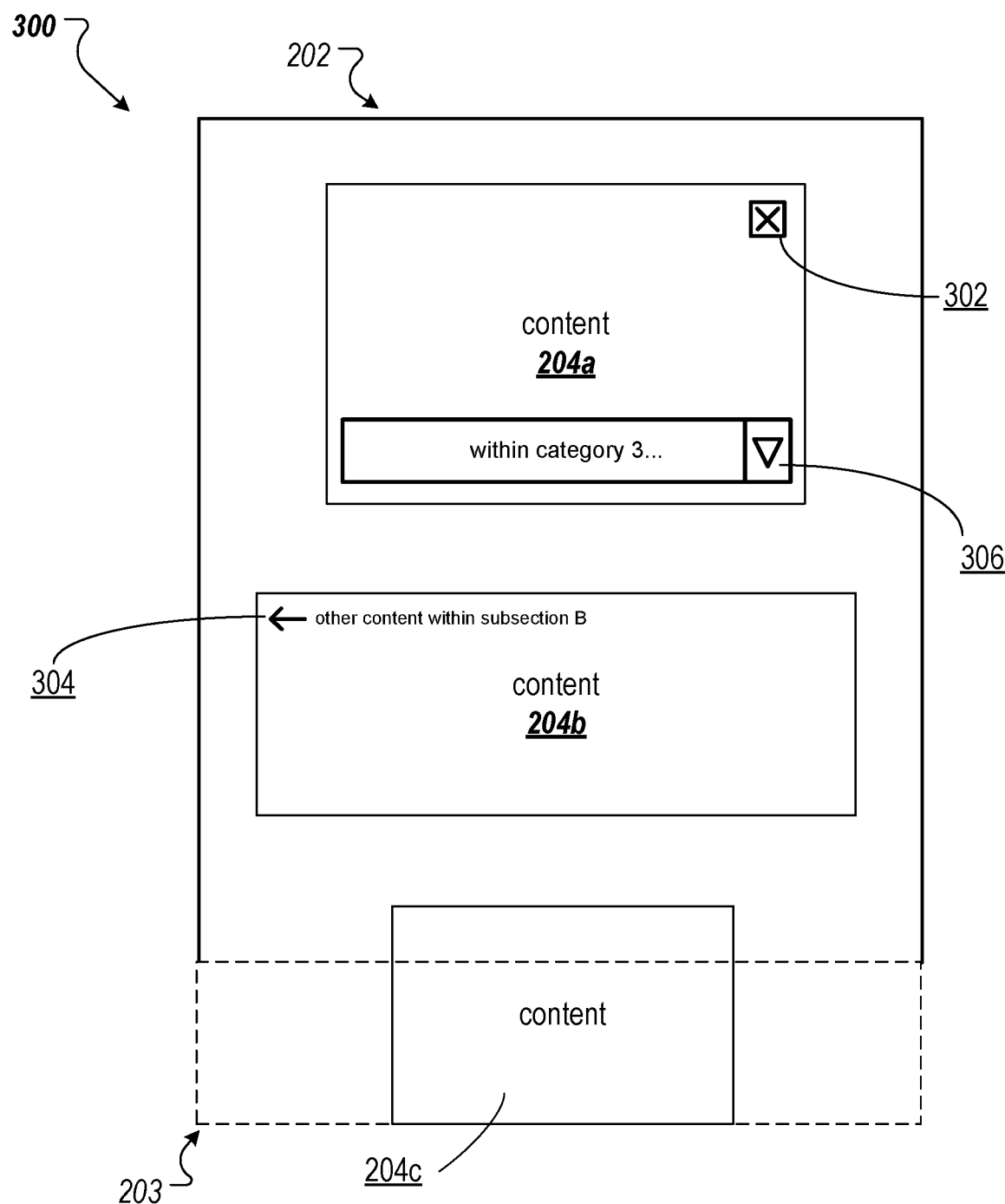
FIG. 3 is an example application user interface that can be customized based on previous user interaction data.

FIG. 3 is an example UI 300 for user interactions with a UI presenting digital components with particular features. The process shown in flow 200 collects data on the interaction between a user and the digital component being presented and populates user interaction database 206, improving personalization and selection of digital components and digital component presentation formats by retaining a record of user interactions, extracting features from the user interaction data, and generating training examples from the extracted features, and training a user interest model using the training examples. In some implementations, a resource (e.g., webpage or application) can contain more content than can be displayed at once within a viewport of a client device. For example, an analytics report can contain several large graphs and tables, and if a user does not scroll down, the user cannot view all of the content. If content is provided outside of the viewport of the UI (e.g., unviewable portion 203), user device 104 can refrain from rendering the data, thus saving processing and memory resources. Therefore, UIM 110 can reduce and/or optimize the usage of computing resources by modifying analytical reports and UI elements to show the UI elements that are most likely of interest to the user in the viewport of the UI. The flow 200 involves training data generator 108, UIM 110, and user device 104.

Each of the user actions that factor into the user interest score. For example, when a user views an explorer report, whether she was looking at the default primary dimensions shown in the report or whether she selected custom metrics and dimensions are considered when training UIM 110. Additionally, the visual aspect of that report (e.g., which metrics are shown, which metrics are scrolled to, which metrics the user spends to most time looking at) are factored into the training examples.

The system can determine whether to use particular user interaction data, and of the set of user interaction data selected, which features to use in generating training examples for a user interest model. In an example, when a user views an overview report, which can include too many metrics to be used for a relevant training example, the system can record the user's view of that report and only analyze the portions of the report that were visible to the user and on which the user spent a threshold amount of time viewing. In another example, when a user is viewing a real-time report, the report is dynamically updated, and it can be difficult to determine which values to record. The system can take a snapshot of the report at a particular time that the user is viewing it, and extract features from this snapshot.

There are many default values for entities in reports and analytical content presented to a user. For example, overview reports can include all available metrics and dimensions and monthly sales summary reports can include default metrics related to sales and revenue, and there are metrics, dimensions, filters, etc. that a user may not be interested in, but are included by default. Generally, all dimensions, metrics, filters, and other entities that are indicated in user interaction data, even if it is only viewing an overview report, are recorded. Thus, it is advantageous to more heavily weight user manipulations and interactions, because these interactions are explicit actions on the part of the user, and these interactions can be more confidently interpreted as intentional expressions of interest.

For example, drilling down to see more specific information can be recorded as user interest in the more specific information, as well as the metric that was drilled down. Other actions that could be interpreted as intentional expressions of either interest or disinters can include changing, removing, or adding a metric, sorting by a metric, changing the primary dimension, changing, removing, or adding a second dimension, changing, removing, or adding a filter, interactions with an insight beyond scrolling past the digital component presentation, viewing or creating a custom report, manual selection and manipulation of data, tabs, UI elements within a report, manual selections (e.g., selecting a graph, selecting an advanced filter within a table, selecting a particular goal), application of a segment—custom or default, performing advanced analysis.

Meaningful feature interactions a user has within an environment which are indicated by events help the system improve the analytics and application experience for the user. By using the previously collected user interaction data, the system can recommend new features and personalize users' reporting experiences (e.g., by suggesting a report to be viewed, providing a filtered view of an existing report, creating an audience, creating a conversion, adding a new user in admin, etc.). When actions are tied to certain data (e.g., set of metrics/dimensions associated with the action) record-keeping by the system aims to preserve the linkage and the timing and sequence in which the user takes the actions.

User interactions with UI elements in which content is presented can provide positive or negative training examples for a machine learning model. For example, within viewport 202, content item 204a includes UI element 302. UI element 302 represents a UI element with which a user can dismiss, decline, or generally provide negative feedback to the content or UI element. For example, if a user selects UI element 302 to dismiss content item 204a, the user interaction data can indicate that content item 204a was dismissed, and that the user is not interested in content item 204a. In this way, the system allows the user to provide feedback through her everyday interactions with the application and without having additional interactions.

In some implementations, UIM 110 can immediately modify an analytical UI based on user interaction data. For example, once a user dismisses a particular UI element containing state-level aggregate statistics instead of county-level aggregate statistics, UIM 110 can determine that the user is likely not interested in state-wide statistics, and will not present those statistics within the viewport of the UI.

In some implementations, UI 300 can present a feedback UI element through which the user can provide further details on why she chose to dismiss content item 204a. For example, the user can select from among predetermined options or enter a freeform response. If the user indicates that she is not interested in content item 204a because she is not interested in the way content item 204 is presented. By providing additional feedback, the user can receive better, more relevant and more easily digestible content. UIM 110 can analyze the feedback to determine, for example, whether the user is temporarily not interested in the analytical data but would like to see it again at a different time, whether the user is interested in the analytical data but would like to see it in a different format, whether the user has pivoted to a different role within her organization and has different statistical reporting needs, etc.

Within viewport 202, content item 204b includes UI element 304. UI element 304 represents a UI element with which a user who wants to see a broader range of content related to content item 204b can see additional content and provide a positive indication of interest in content item 204b. For example, if a user selects UI element 304 to see "other content within subsection B," the user interaction data can indicated that content item 204b was dismissed, and that the user is interested in seeing different or more content related to content item 204b. A user could be viewing a UI element presenting statistics of users in Bergen County within subsection B—New Jersey—and select UI element 304 to see other content within the New Jersey subsection, such as Hudson County. This user interaction can produce user interaction data to indicate that the user is interested in content within the dimension "New Jersey," but is not interested in Bergen County.

Within viewport 202, content item 204a includes UI element 306. UI element 306 represents a UI element with which a user who wants to narrow the range of content related to content item 204a can see additional content and provide a positive indication of interest in content item 204a. For example, if a user selects UI element to drill down and see more content within category 3 of content. In some implementations, UI element 306 allows a user to select a different category within the classification in which content item 204a resides. A user could be viewing a UI element presenting statistics of users who own a vehicle and select UI element 306 to drill down to see users who own minivans. This user interaction can produce user interaction data to indicate that the user is interested in the dimension of users who own a vehicle, and are further interested in the dimension of minivans. UIM 110 can utilize this user interaction data to predict, for example, that the user may be interested in the dimension of users who have a household of more than two persons.

Within hidden portion 203, content item 204c is presented, but may not be rendered. For example, if a threshold portion of content item 204c is not visible from the user's present position within the UI 300, the system 100 can refrain from rendering content item 204c to conserve computing resources. In some implementations, if the user scrolls down to view content item 204c, the action of scrolling such that content item 204c is within viewport 202 for at least a predetermined period of time can be considered a positive indication of interest in content item 204c. UIM 110 can then generate a positive training example from the scrolling action. A user could see the top of content item 204c and determine that content item 204c is of interest to him; if the user scrolls such that content item 204c is within viewport 202 for at least 20 seconds, this user interaction data can indicate to UIM 110 that the user is interested in content item 204c. If, however, the user scrolls such that content item 204c is within viewport 202 and determines that content item 204c is not of interest, he can scroll away; the user interaction data indicating that content item 204c is not within viewport 202 for at least 20 seconds can be interpreted by UIM 110 to be a negative training example.

Other user interactions, such as zooming on a portion of a page or particular UI element, marking a content item or presentation format as helpful, spending at least a predetermined period of time viewing or interacting with a content item or UI element, querying for particular content, etc. can also serve as a positive indication of interest.

Figure 4:
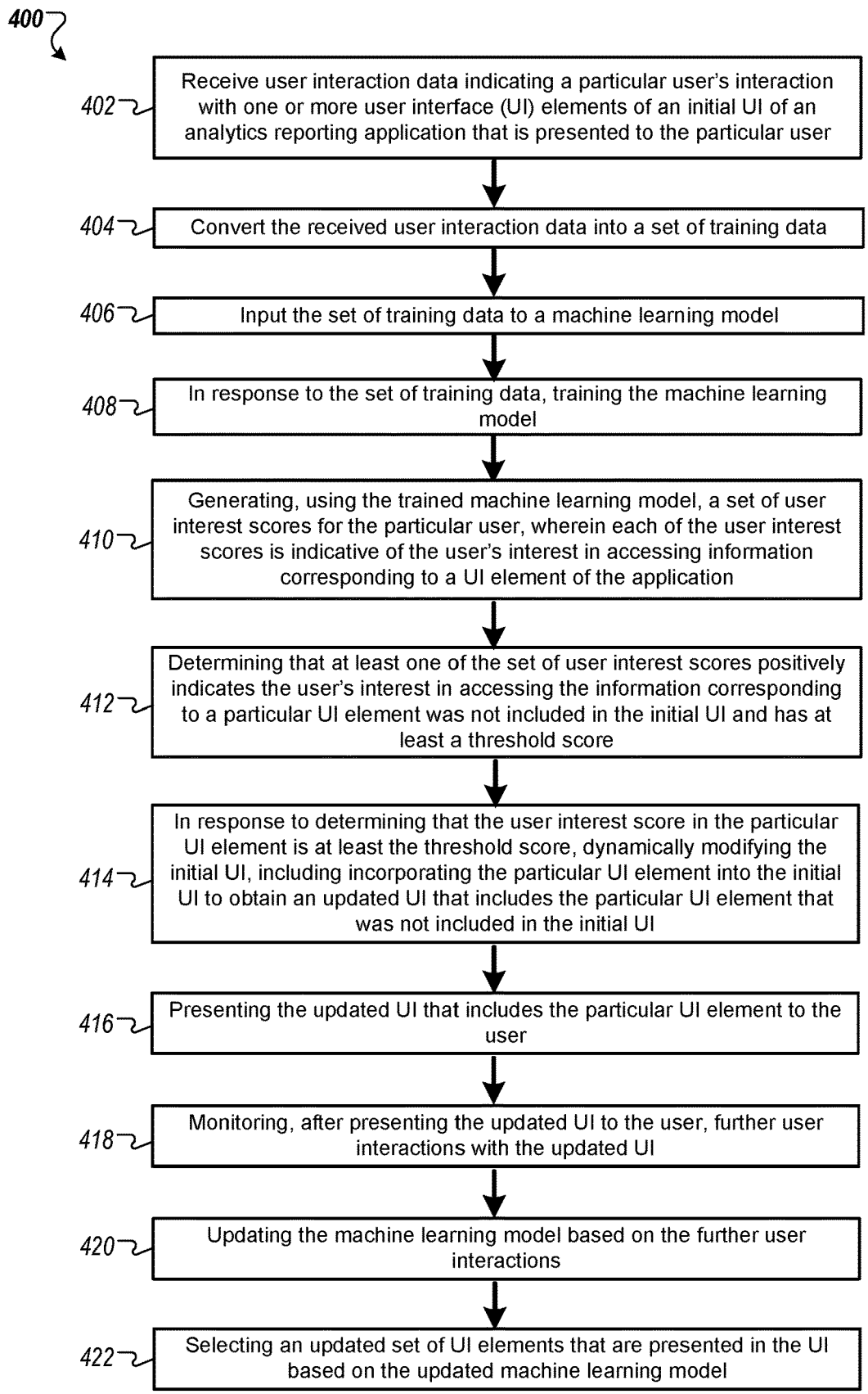
FIG. 4 is a flow chart of an example process for determining to refrain from submitting an opportunity to transmit a digital component to a user.

FIG. 4 is a flow chart of an example process 400 for personalizing an analytical environment and user experience based on previously collected user interaction data. In some implementations, the process 400 can be implemented by one or more servers. For example, the process 400 can be implemented by training data generator 108 and UIM 110 of FIGS. 1-2. In some implementations, the process 400 can be implemented as instructions stored on a non-transitory computer readable medium, and when the instructions are executed by one or more servers, the instructions can cause the one or more servers to perform operations of the process 400.

The system receives user interaction data indicating a particular user's interaction with one or more UI elements of an initial UI of an analytics reporting application that is presented to the particular user (402). For example, training data generator 108 can collect user interaction data and feature extractor 109 can extract features of the recorded user interactions. These interactions can include, for example, clicking on a UI element to indicate interest, to dismiss the UI element, to view other UI elements related to the UI element, etc. as described above.

The system can build a database that tracks user interactions. The user interaction data can represent, for example, features of content in which a particular user is interested. The data is processed through a pipeline of data processing tasks, e.g., the system processes the data to extract features of the data, such as metrics, dimensions, filters, etc. For example, the database can track how often and how recently a particular user has had an interaction with a particular metric, dimension, dimension filter, etc. In this particular example, the database can be user interaction database 206.

The system converts the received user interaction data into a set of training data (404). Once the system has extracted features of the user interaction data, the system generates training examples to provide to a machine learning model to predict user interest. In this particular example, feature extractor 109 provides the extracted features to training data generator 108, which uses the recorded user interaction data and the extracted features to generate training examples. The training examples can include pairs of input and expected output. The training examples can be influenced by user interaction data and are used by UIM 110 to identify analytical report items and UI elements that are likely to be of interest to the user.

The system inputs the set of training data to a machine learning model (406). In this particular example, training data generator 108 provides the training examples to UIM 110, and specifically to neural network 111a. Other types of machine learning models can be used, as described above.

In response to the set of training data, the system trains the machine learning model (408). In this particular example, UIM 110 trains neural network 111a with the training examples from training data generator 108. In some implementations, UIM 110 goes through multiple iterations of training, validation, and feature extraction. For example, UIM 110 could continue training neural network 111a until a threshold confidence score for a particular feature for a particular user or profile has been reached.

The system generates, using the trained machine learning model, a set of user interest scores for the particular user, wherein each of the user interest score is indicative of the user's interest in accessing information corresponding to a UI element of the application (410). In this particular example, UIM 110 uses neural network 111a to generate user interest scores for each entity referenced by the UI element to provide an overall interest score for the UI element.

The system can then determine that at least one of the set of user interest scores positively indicates the user's interest in accessing the information corresponding to a particular UI element was not included in the initial UI and has at least a threshold score (412). In this particular example, UIM 110 can determine that at least one of the user interest scores indicates that the user is interested in content corresponding to a UI element (e.g., including different content, or including the same content in a different presentation format).

In response to determining that the user interest score in the particular UI element is at least the threshold score, the system dynamically modifies the initial UI, including incorporating the particular UI element into the initial UI to obtain an updated UI that includes the particular UI element that was not included in the initial UI (414). In this particular example, if UIM 110 determines that the user is interested in a particular content presentation format, user interface generator 111b can generate UI instructions that, when executed, cause presentation of content in the particular content presentation format. If UIM 110 determines that the user is interested in content that was not previously presented, UIM 110 utilizes the user interest score to select content most likely to be of interest to the user. UIM 110 can rank or select content and modify an analytical UI to present, within a viewport of the UI, the content most likely to be of interest to the user to improve the user's experience and assist the user with navigating the large number of options and UI elements available within the analytical UI.

The system presents the updated UI that includes the particular UI element to the user (416). In this particular example, user interface generator 111b provides the UI instructions to user device 104 to cause presentation of the particular UI element. UIM 110 modifies the particular UI element to present content that is most likely to be of interest to the user based on the generated user interest scores.

The system monitors, after presenting the updated UI to the user, further user interactions with the updated UI (418). In this particular example, training data generator 108, and more specifically, feature extractor 109 continually collects user interaction data and extracts features, recording user interaction data in user interaction database 206 and recording user profile data in user profiles 208.

The system updates the machine learning model based on the further user interactions (420). In this particular example, training data generator 108 generates updated training examples and provides the updated training examples to UIM 110. UIM 110 can continually retrain neural network 111a based on current user interaction data.

The system selects an updated set of UI elements that are presented in the UI based on the updated machine learning model (422). In this particular example, user interface generator 111b can continually update the UI instructions provided to user device 104 and neural network 111a can continually update the user interest scores UIM 110 utilizes to dynamically modify a user's environment and analytics experience based on recorded user interaction data.

Figure 5:
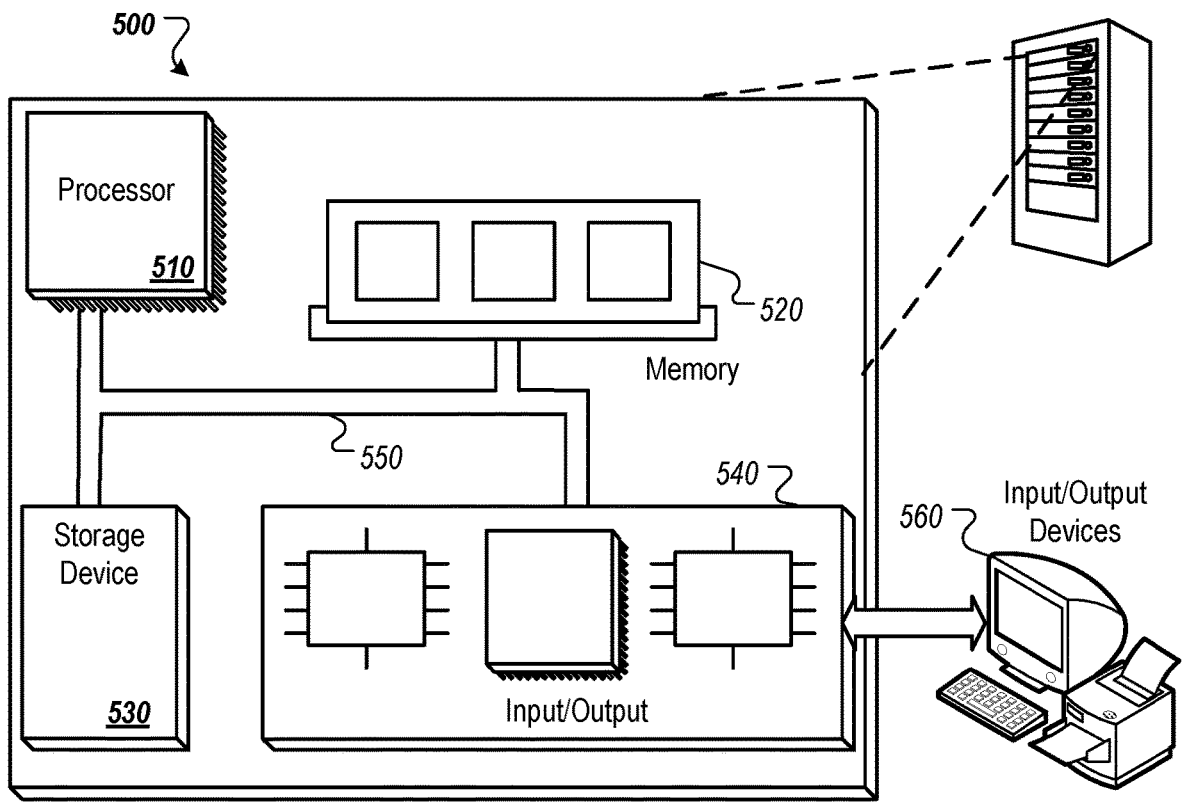
FIG. 5 is a block diagram of an example computing system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a computing device, the method comprising:
    receiving, by the computing device, user interaction data indicating interactions of a first user with one or more user interface (UI) elements of an initial UI of an analytics reporting application that is presented to the first user;
    generating, from the received user interaction data, a set of training data, wherein generating the training data comprises:
        selecting, from the user interaction data and as a set of features for inclusion in the set of training data, UI elements and dimensions of content presented by the UI elements based at least in part on respective durations for which the UI elements and dimensions of content were presented to the first user, and
        classifying a first portion of the features as positive features based on the first user requesting the features and classifying a second portion of the features as negative features based on the second portion of the features being initial content presented by the initial UI that was presented for less than a threshold duration;
    inputting the set of training data to a machine learning model;
    in response to the set of training data, training, by the computing device, the machine learning model;
    generating, using the trained machine learning model, a set of user interest scores for a second user, wherein each of the user interest scores is indicative of the second user's interest in accessing information corresponding to a UI element of the analytics reporting application;
    determining that at least one of the set of user interest scores positively indicates the second user's interest in accessing the information corresponding to a particular UI element that was not included in the initial UI based upon a threshold score associated with the particular UI element;
    in response to determining that at least one of the set of user interest scores positively indicates the second user's interest in accessing the information corresponding to the particular UI element, dynamically modifying the initial UI, including incorporating the particular UI element into the initial UI to obtain an updated UI that includes the particular UI element that was not included in the initial UI; and
    presenting the updated UI that includes the particular UI element to the second user;
    monitoring, after presenting the updated UI to the second user, further user interactions with the updated UI;
    updating the machine learning model based on the further user interactions; and
    selecting an updated set of UI elements that are presented in the UI based on the updated machine learning model.

2. The method of claim 1, wherein the machine learning model is a logistical regression model.

3. The method of claim 1, wherein the machine learning model performs deep and wide learning that combines a wide linear model for memorization with a deep neural network for generalization across a plurality of features.

4. The method of claim 1, wherein the machine learning model is a long short-term memory model.

5. The method of claim 1, further comprising determining that a score of the set of user interest scores associated with a further UI element is less than a threshold score associated with the further UI element, wherein the further UI element is not displayed to the second user based on the determining.

6. The method of claim 1, further comprising classifying the second user based on the second user's interactions and characteristics.

7. The method of claim 1, wherein the received user interaction data relates to two or more different topics, and
    wherein each of the two or more different topics is assigned a different weight based on an importance of the topic to the user determined from the user interest score for the topic.

8. The method of claim 1, further comprising receiving a set of user interaction data indicating a group of multiple different users' interactions with one or more UI elements;
    generating, from the received set of user interaction data, a set of user group training data;
    inputting the set of user group training data to the machine learning model; and
    in response to the set of group training data, training, by the computing device, the machine learning model.

9. The method of claim 1, wherein the first user and the second user are the same user.

10. The method of claim 1, wherein the first user and the second user are different users.

11. The method of claim 1, further comprising:
    determining, for the second user, that a user-specific machine learning model has at least a threshold confidence level after obtaining a sufficient amount of user interaction data for the second user and training the user-specific machine learning model using the user interaction data for the second user; and
    switching, from the machine learning model to the user-specific machine learning model when updating the UI for the second user in response to determining that the user-specific machine learning model has at least a threshold confidence level.

12. The method of claim 1, wherein at least one of the initial UI or the updated UI is presented to the first user by a game console.

13. A system comprising:
    a computing device comprising at least one processor; and
    a memory communicatively coupled to the at least one processor, the memory storing instructions which, when executed by the at least one processor, cause the at least one processor to perform operations comprising:
        receiving, by the computing device, user interaction data indicating interactions of a first user with one or more user interface (UI) elements of an initial UI of an analytics reporting application that is presented to the first user;
        generating, from the received user interaction data, a set of training data, wherein generating the training data comprises:

selecting, from the user interaction data and as a set of features for inclusion in the set of training data, UI elements and dimensions of content presented by the UI elements based at least in part on respective durations for which the UI elements and dimensions of content were presented to the first user;

inputting the set of training data to a machine learning model, and classifying a first portion of the features as positive features based on the first user requesting the features and classifying a second portion of the features as negative features based on the second portion of the features being initial content presented by the initial UI that was presented for less than a threshold duration;

in response to the set of training data, training, by the computing device, the machine learning model;

generating, using the trained machine learning model, a set of user interest scores for a second user, wherein each of the user interest scores is indicative of the second user's interest in accessing information corresponding to a UI element of the analytics reporting application;

determining that at least one of the set of user interest scores positively indicates the second user's interest in accessing the information corresponding to a particular UI element that was not included in the initial UI based upon a threshold score associated with the particular UI element;

in response to determining that at least one of the set of user interest scores positively indicates the second user's interest in accessing the information corresponding to the particular UI element, dynamically modifying the initial UI, including incorporating the particular UI element into the initial UI to obtain an updated UI that includes the particular UI element that was not included in the initial UI; and presenting the updated UI that includes the particular UI element to the second user;

monitoring, after presenting the updated UI to the second user, further user interactions with the updated UI;

updating the machine learning model based on the further user interactions; and selecting an updated set of UI elements that are presented in the UI based on the updated machine learning model.

14. The system of claim 13, wherein the machine learning model is one of (i) a logistical regression model, (ii) a deep and wide learning model that combines a wide linear model for memorization with a deep neural network for generalization across a plurality of features, or (iii) a long short-term memory model.

15. The system of claim 13, further comprising determining that a score of the set of user interest scores associated with a further UI element is less than a threshold score associated with the further UI element, wherein the further UI element is not displayed to the second user based on the determining.

16. The system of claim 13, further comprising classifying the second user based on the second user's interactions and characteristics.

17. The system of claim 13, wherein the first user and the second user are the same user.

18. The system of claim 13, wherein the first user and the second user are different users.

19. The system of claim 13, wherein at least one of the initial UI or the updated UI is presented to the first user by a game console.

20. A non-transitory computer-readable storage device storing instructions that when executed by one or more processors of a computing device cause the one or more processors to perform operations comprising:

receiving, by the computing device, user interaction data indicating interactions of a first user with one or more user interface (UI) elements of an initial UI of an analytics reporting application that is presented to the first user;

generating, from the received user interaction data, a set of training data, wherein generating the set of training data comprises:

selecting, from the user interaction data and as a set of features for inclusion in the set of training data, UI elements and dimensions of content presented by the UI elements based at least in part on respective durations for which the UI elements and dimensions of content were presented to the first user, and classifying a first portion of the features as positive features based on the first user requesting the features and classifying a second portion of the features as negative features based on the second portion of the features being initial content presented by the initial UI that was presented for less than a threshold duration;

inputting the set of training data to a machine learning model;

in response to the set of training data, training, by the computing device, the machine learning model;

generating, using the trained machine learning model, a set of user interest scores for a second user, wherein each of the user interest scores is indicative of the second user's interest in accessing information corresponding to a UI element of the analytics reporting application;

determining that at least one of the set of user interest scores positively indicates the second user's interest in accessing the information corresponding to a particular UI element that was not included in the initial UI based upon a threshold score associated with the particular UI element;

in response to determining that at least one of the set of user interest scores positively indicates the second user's interest in accessing the information corresponding to the particular UI element, dynamically modifying the initial UI, including incorporating the particular UI element into the initial UI to obtain an updated UI that includes the particular UI element that was not included in the initial UI; and presenting the updated UI that includes the particular UI element to the second user;

monitoring, after presenting the updated UI to the second user, further user interactions with the updated UI;

updating the machine learning model based on the further user interactions; and selecting an updated set of UI elements that are presented in the UI based on the updated machine learning model.

21. The computer-readable storage device of claim 20, the operations further comprising:

receiving a set of user interaction data indicating a group of multiple different users' interactions with one or more UI elements;

generating, from the received set of user interaction data, a set of user group training data;

inputting the set of user group training data to the machine learning model; and in response to the set of group training data, training, by the computing device, the machine learning model.

22. The computer-readable storage device of claim 20, wherein at least one of the initial UI or the updated UI is presented to the first user by a game console.

\* \* \* \* \*